United States Patent [19]

Scott et al.

[11] Patent Number: 5,032,096
[45] Date of Patent: Jul. 16, 1991

[54] LAMINAR DEVICE AND METHOD FOR MAKING SAME

[76] Inventors: David A. Scott; Stephen S. Williams, both of 43 Clover La., Laguna Hills, Calif. 92656

[21] Appl. No.: 391,969

[22] Filed: Aug. 10, 1989

[51] Int. Cl.$^5$ .............................................. B32B 31/00
[52] U.S. Cl. ..................................... 441/74; 114/140
[58] Field of Search ...................... 441/65, 74; 428/71, 428/76, 313.5, 317.1, 318.4, 319.3, 319.7, 319.9, 480, 521; 114/343, 355, 357, 127, 140, 90; 264/45.3, 45.4, 45.5, 45.7, 46.4, 46.5, 46.6, 74, 75, 211, 269, 570, DIG. 83

[56] References Cited

U.S. PATENT DOCUMENTS

| | | | |
|---|---|---|---|
| 4,209,867 | 7/1980 | Abrams | 441/74 |
| 4,255,221 | 3/1981 | Young | 441/74 |
| 4,302,859 | 12/1981 | Kozminski | 441/74 |
| 4,325,154 | 4/1982 | Collum | 441/74 |
| 4,383,955 | 5/1983 | Rubio | 441/74 |
| 4,551,290 | 11/1985 | Mizell | 441/74 |
| 4,713,032 | 12/1987 | Frank | 441/74 |
| 4,753,836 | 6/1988 | Mizell | 441/74 |
| 4,798,549 | 1/1989 | Hirsch | 441/74 |

Primary Examiner—Joseph F. Peters, Jr.
Assistant Examiner—Clifford T. Bartz
Attorney, Agent, or Firm—G. Donald Weber, Jr.

[57] ABSTRACT

A strong, lightweight laminar device which can be used as a fin attachment for surfboards and sail boards, or as a skateboard, sailboard or surfboard, per se. The device comprises a lightweight core and one or more layers of strengthening material surrounding the core. In fabricating the device, a suitably shaped mold is lined with a strengthening layer of carbon fiber. A separating layer of random glass is placed between a first strengthening layer and a second, similar strengthening layer. The space at the interior of the lined mold is filled with an appropriate lightweight, buoyant filler material such as polyurethane foam. After the filler is set or cured, the device is removed from the mold and treated or assembled as desired.

16 Claims, 1 Drawing Sheet

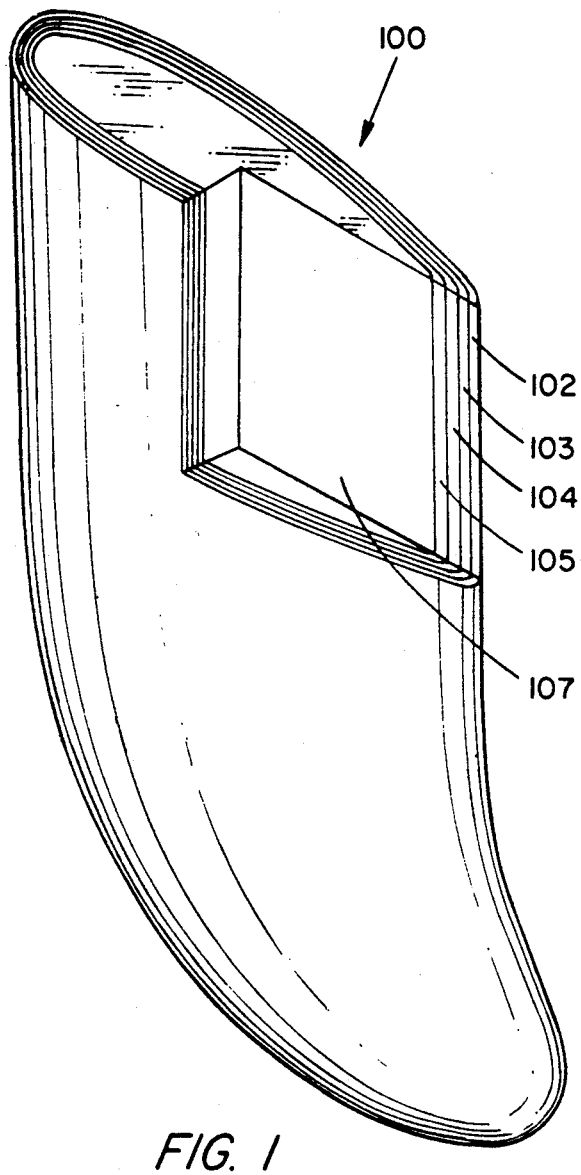
FIG. 1
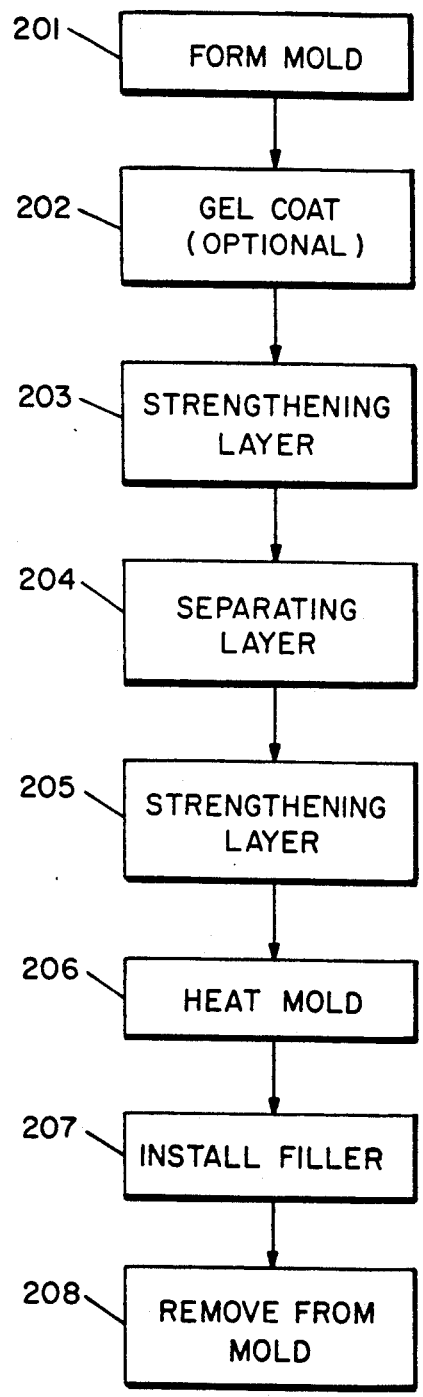

LAMINAR DEVICE AND METHOD FOR MAKING SAME

BACKGROUND

1. Field of the Invention

This invention is directed to an improved laminar device useful as a fin for surfboards or the like, in general, and to a strong, lightweight fin which does not cause a weight imbalance or other disruptions with the supporting structure, in particular.

2. Prior Art

In water sports such as surfboarding and wind surfing, among others, a fin is used with a board to provide balance and greater control. Typically, the fin is fabricated of a rigid, heavy material which is non-bouyant, thereby creating a tail-heavy condition on the supporting structure. This causes the surfboard to be out-of-balance and tends to offset or reduce the advantage sought by the use of the fin. To compensate for the imbalance created by the heavy fin, the sports enthusiast often decreases the weight of the supporting structure itself in the tail area by shaving it down. The result of this procedure is an improved balance of the supporting structure, such as the surfboard. However, it also weakens the surfboard in the tail area, thereby increasing the tendency of the surfboard to break in that area. The prior art fins require a compromise between the benefits of maneuverability and stability versus the detriment of tail-heavy imbalance. Furthermore, the prior art fins are of such construction that they are susceptible to being damaged because of the inherent structural weakness thereof.

The fin of the present invention is designed to overcome the drawbacks of the prior art fins by providing a strong fin with positive buoyancy. This means that the supporting structure need not be counterbalanced and thereby weakened in order to compensate for the fin of this invention. Also, the fin of this invention is of an inherently stronger construction than those presently available. The characteristics of both strength and weight available by this process may also have other possible applications, such as skateboards, surfboards and the like.

PRIOR ART STATEMENT

The applicant made no prior art search.

SUMMARY OF THE INSTANT INVENTION

The instant invention is directed to a laminar structure or device which is strong, durable but lightweight. It is useful in many types of products. A primary embodiment takes the form of a "floater fin" which is adapted to be mounted onto the posterior of such items as surfboards, windsurfers, and the like, thereby providing stability and maneuverability of the item. The actual shape of the fin can vary according to where it will be used as well as the means of attachment.

The instant invention provides a fin which exhibits strength and bouyancy and the process for producing same. The strength for the fin is provided by one or more layers of fiber-type material, such as carbon fiber material. Other strong fabrics may be used such as Kevlar. The filler, a lightweight, open cell material such as polyurethane foam, provides the positive buoyancy.

An exterior layer such as a gel coat can provide a strong, protective and ornamental outer skin.

An optional feature is to color the fin. Several methods are possible. One common method is to use a colored gel coat. The gel coat often provides a somewhat smoother surface but does add weight to the fin.

BRIEF DESCRIPTION OF THE DRAWINGS

FIG. 1 is an isometric, cut-away view of one embodiment of the instant invention in the configuration of a floater fin.

FIG. 2 is a diagram of the process used to produce the laminar device of the instant invention.

DESCRIPTION OF THE PREFERRED EMBODIMENT

FIG. 1 is a partially cut-away view of the fin 100 produced in accordance with the preferred embodiment of instant invention. While a fin configuration is shown and described, it must be understood that other configurations of the invention are contemplated. The fin 100 is a floater fin of appropriate shape to suit the supporting structure such as a surfboard, windsurfer, or the like. Typically, the fin has a generally oval cross-sectional configuration and tapers toward a rounded, pointed end. The pointed end typically has a swept back design to permit reduced drag in water and, as well, to reduce the chance of injury to those in the water. The cut-away portion shows one representative configuration and several layers of the fin. The outermost layer 103 is a gel coat which is comprised of a liquid resin with a polyester or epoxy base. In general, the gel coat layer 102 adds the possible cosmetic factors of color and a bit smoother appearance. Layer 103 is composed of an impregnated fiber layer which imparts strength and rigidity to the fin. Typically, layer 103 is comprised of carbon fiber. In the preferred embodiment, a strengthening layer 103 is a 12K unidirectional tape placed within the preformed mold which is used to produce the product. In another embodiment, additional carbon fiber is added as 3K bidirectional carbon fabric and/or 12K unidirectional tape as needed for strength and stiffness. Although carbon fiber is described in these embodiments, other strengthening fabrics are contemplated including Kevlar or the like.

The next layer towards the interior of the device is the separating layer 104. In one embodiment, layer 104 is a layer of random glass which is placed between two strengthening layers. In the preferred embodiment, a one-ounce random glass sheet is used as layer 104, but other sizes and materials are contemplated. In the embodiment shown in FIG. 1, strengthening layer 105, also formed of the carbon fiber, is used to provide additional strength. The strengthening layer 105 is similar to the layer 103. While the preferred embodiment includes two strengthening layers composed of carbon fibers separated by a random glass layer, other combinations of layers and materials are contemplated.

The interior of the fin 100 contains a filler core 107 of polyurethane. The polyurethane filler core provides strength, rigidity and light weight and is discussed in greater detail relative to FIG. 2.

It should the understood that the outermost layer 102 is the gel coat. This layer, as well as the strengthening layer 105 and the separating layer 104, is optional and may be omitted. Of course, in some instances, additional strengthening and separating layers maybe utilized.

Referring now to FIG. 2, there is shown a chart diagram representative of the production process for making the floater fin (or other implementations) of the instant invention. Initially, the process begins with the formation 201 of a mold by conventional and well known methods. Typically, an aluminum mold with one or more cavities therein is produced. The shape of the mold depends upon the intended form of the product, for example, a floater fin 100 on a surfboard, windsurfer, sail boat, or other similar supporting structure or as a surfboard, a skateboard, or the like.

In one embodiment, a gel coat 102 is applied in step 202 as a thin layer to the inner surface of the mold by the conventional methods of brushing, spraying, or other suitable technique. The gel coat 102 provides color and a somewhat smoother surface for the finished fin. It must be understood, however, that this cosmetic gel coat is primarily optional and can be omitted, if so desired.

In step 203, the strengthening layer 103 is placed either directly into the inner surface of the mold (not shown) or onto the optional gel coat layer 102 which may be present. If the gel coat layer 102 is present, the first strengthening layer 103 is set in place while the gel is still tacky. Then the subsequent layers, as in the non-gel coated fin, are applied as desired.

In a preferred embodiment, the first strengthening layer 103 is formed of a carbon fiber material in the form of 12K unidirectional tape which is a tape having 12,000 filaments per toe or strand. In other embodiments where greater strength or thickness is required or desired, 3K bidirectional carbon fabric is layered upon the 12K unidirectional tape. Various combinations of such layers are also to be considered. Other embodiments may use different strengthening materials among which Kevlar is contemplated.

In step 204, a separating layer 104 of random glass is placed upon the first strengthening layer 103. In the preferred embodiment, a single sheet of one ounce random glass is used. Other embodiments use different weights of random glass. Alternatively, more than one sheet of the separating material 104 can be used, if desired. The separating layer 104 provides some strength to the fin 100, but primarily separates the strengthening layers 103 and 105 whenever both are present. Other means or materials to separate the strengthening layers are contemplated.

In step 205, a strengthening layer 105 is applied on top of the separating layer 104. Layer 105 is similar to the first strengthening layer 103. In the preferred embodiment, the strengthening layer 105 is formed of a carbon fiber material in the form of 12K unidirectional tape. Other embodiments can use 3K bidirectional carbon fabric, Kevlar, and similar suitable material to provide the strength in the same manner as discussed regarding the first strengthening layer 103.

After the several layers have been assembled, the mold is heated as depicted in step 206. In the preferred embodiment, the mold contains strengthening layers 103 and 105 with a separating layer 104 therebetween. These layers, generally, surround a central opening or void in the product being formed. With this arrangement of materials, the mold 100 is heated by conventional means such as heating coil, lamps, hot plates, or heating blanket, among others, to a temperature in the range of 120 to 130 degrees F. Of course, in other embodiments using other materials, the appropriate temperature may vary. Once the mold 100 is heated to the prescribed temperature, prepared filler material 107 is inserted during step 207.

In the preferred embodiment, the filler material 107 is polyurethane composed of polymer and isocyanate in a preferred ratio range of 1:1.6 to 1:1.8 depending upon the amount of flex desired in the fin or the product. The filler material is selected to provide positive bouyancy and suitable flex for the products of the invention. Other embodiments may use different fillers and different ratios so long as the requirements of flex and bouyancy are satisfied.

In the preferred embodiment the polyurethane is prepared by conventional methods known in the art. The filler materials are measured and mixed to form a uniform liquid or flowable mass. The polymer and isocyanate are poured into the mold by any suitable means, such as manual means or by means of a reaction-injection-mold (RIM) machine or the like. Generally, the filler material is placed in the heated mold by pouring, injecting, or any other suitable technique. Injection by the RIM machine is preferred because it is both simpler and faster, but other means are contemplated.

When the filler material 107 is poured into the mold, in particular, into the central void defined by the several layers, the strengthening layers 103 and 105, as well as the separating layer 104, become saturated by the filler material 107 as well as filling the cavity. In other embodiments, all of the layers present are likewise saturated when the filler is installed.

The contents of the mold cavity are permitted to cure for approximately three (3) minutes. The mold is then opened and the formed product is removed. The mold can then be readied for a repetition of the process.

The mold can be heated prior to the insertion of the polyfoam filler materials as noted. Alternatively, the mold can be heated substantially continuously, i.e. during or prior to the application of the materials thereto.

In alternative embodiments of the process, steps 204 and 205 can be omitted. Of course, in still other embodiments of the process, additional steps (and layers) may be provided. While a fin configuration is shown and described, it must be understood that other configurations and implementations of the invention are contemplated.

Thus, there is shown and described a preferred embodiment of the instant invention. Those skilled in the art may conceive of modifications or variations to the described embodiment. However, any such modifications or variations which fall within the purview of this description are intended to be included therein, as well. For example, other embodiments may have more or fewer strengthening layers of carbon fiber and may or may not include the random glass layer. The use of this invention has been described in the configuration of a fin, but may be used in the surfboard proper, skateboards or water skis, among other possibilities. The description is intended to be illustrative only and is not intended to be limitative. Rather, the scope of the invention is limited only by the claims appended hereto.

We claim:

1. A method for preparing a one piece, lightweight laminar device comprising the steps of:

forming a molding means having at least one cavity therein;

applying a first strengthening means onto the inner surface of said cavity in said molding means;

applying a separating means onto said first strengthening means in said cavity in said molding means;

applying a second strengthening means onto said separating means in said cavity in said molding means;

heating said molding means;

installing a filler material leaving a positive buoyancy characteristic into said cavity in said molding means;

curing the contents of said cavity in said molding means; and removing said molding means.

2. The method as recited in claim 1, wherein, said separating means is comprised of random glass.

3. The method as recited in claim 1 which further comprises the step of:

applying a gel to said cavity in said molding means prior to applying said first strengthening means.

4. The method as recited by claim 3 wherein, said gel is composed of a resin comprised of at least one of the class comprising;

a polyester based resin, an epoxy based resin, and a colored resin.

5. The method as recited in claim 1 wherein, said strengthening means is comprised of carbon fiber including 12K unidirectional tape.

6. The method as recited in claim 5, wherein, said strengthing means is further comprised of 3K bidirectional carbon fabric.

7. The method as recited in claim 1 wherein, said filler material is comprised of polyurethane foam.

8. The method as recited in claim 7 wherein, said polyurethane foam is prepared in the ratio of one part polymer to 1.6 to 1.8 isocynate.

9. A fin comprising, first hollow, concave strengthening means having at least one opening therein;

filler material having positive bouyancy within said opening in said strengthening means;

said filler material is comprised of polyurethane foam.

10. The fin recited in claim 9 wherein, said filler material comprises one part polymer to 1.6 to 1.8 parts isocynate.

11. The fin recited in claim 9, including:

a second hollow concave strengthening means; and a separating means between said first and said second strengthening means.

12. The fin recited in claim 9 including, a gel layer exterior to said first strengthening means.

13. The fin recited in claim 9, wherein, said strengthening means is comprised of carbon fiber in the form of 12K unidirectional tape.

14. The fin recited in claim 13, wherein, said strengthening means is further comprised of 3K bidirectional carbon fabric.

15. The fin recited in claim 11, wherein, said separating means is comprised of random glass.

16. The fin recited in claim 12 wherein, said gel layer is comprised of a resin.

* * * * *